Feb. 4, 1936.                P. SCHUBERT                2,029,677
                DRIVING GEAR FOR COUNTING MECHANISMS
                       Filed Dec. 5, 1934
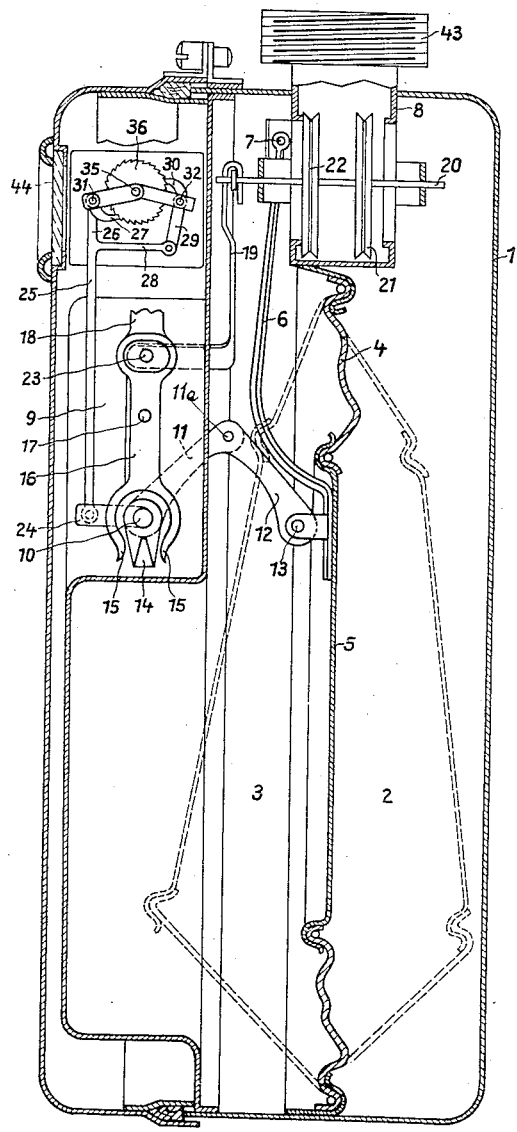
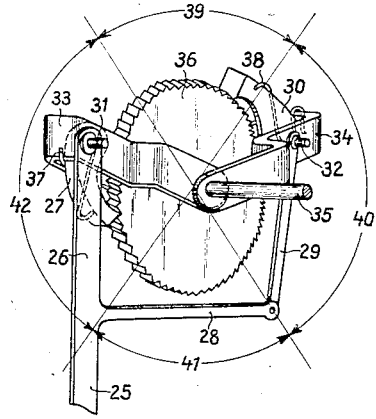
Inventor:
Paul Schubert
By
Attorney Patented Feb. 4, 1936

2,029,677

UNITED STATES PATENT OFFICE 2,029,677

DRIVING GEAR FOR COUNTING MECHANISMS

Paul Schubert, Berlin, Germany, assignor to Allgemeine Elektricitats-Gesellschaft, Berlin, Germany Application December 5, 1934, Serial No. 756,128
In Germany December 30, 1933

6 Claims. (Cl. 74—143)

This invention relates to driving gears for counting mechanisms, especially such for use in connection with gas meters. More especially, it relates to the pawl feeding mechanism by means of which the wheels of the counting device are moved. The object of the invention is on the one hand a general improvement of the driving gears, and on the other hand a simplification of the same, especially as regards the feed wheel proper that cooperates with the pawls of the pawl feeding mechanism.

With an ordinary pawl feeding mechanism every pawl turns at every stroke, if the gas meter is equally loaded, that is to say, at equal strokes of the rods actuating the pawl feeding mechanism, the feeding wheel for a certain distinct angle. There is at every pawl stroke a certain back-lash or lost motion, of every pawl possible, in that it is possible that a pawl comes to a standstill, after it has finished its stroke, between two engaging flanks of two neighbouring teeth of the pawl feeding mechanism. Under certain conditions that back-lash or lost motion may constitute a continual and constant occurrence if the gas-meter is always equally loaded, that is to say, if the strokes of the rods pertaining to the pawl feeding mechanism remain constant. If, however, the load on the gas-meter varies, then also the back-lash or lost motion varies so that at different loads of the gas-meter correspondingly different faults in the statements of the measuring indications arise. It is, therefore, impossible to gauge a gas-meter with consideration of a certain distinct measuring fault, at least to gauge it with a practically satisfying accuracy. The measuring faults may become, in fact, quite considerable, as the measuring faults of the individual pawl strokes sum up.

The object proper of the present invention is to reduce considerably the measuring faults arising from the above-mentioned cause, and I attain the object in view by designing the feeding wheel of the pawl feeding mechanism in a way that said wheel has only one row of teeth on its rim and that said teeth have two different pitches. The effect of designing said wheel in this way is that the back-lash or lost motion does not remain constant even at constant load of the gas-meter but varies in the course of time. The limits of this variation of the back-lash or lost motion of the pawls are the result of the distribution of the different tooth pitches on the circumference of the feeding wheel and vary within the distance between two adjacent tooth engaging flanks.

It is particularly important to distribute the different pitches on the circumference of the feeding wheel in such a way that where two pawls are employed, one thereof engages teeth having the one pitch and the other thereof engages the teeth having the other pitch. The number of the one sort of teeth need differ from the number of the other sort of teeth only a little, for instance only by one tooth.

Owing to the continual variation of the lost pawl motion from pawl stroke to pawl stroke, there varies also the measuring fault, which may become alternately larger and smaller, continually around a medium value, for which the gasmeter may be gauged. Tests have proved that variations of the load can not any more influence materially the medium inaccuracy of the indications of the gas-meter. The gauging curve determined for a certain definite load of the gasmeter can be considered to be correct and can be used for all loads of the gas-meter without entailing a material fault. The measuring faults of the individual strokes remain different, but as regards the final result they vary by a medium value which remains nearly constant.

In this way driving gears for counting devices provided with a pawl feeding mechanism get the character of the stroke length counting devices, in that they measure accurately not the individual strokes of the gas meter diaphragm, but the length of way of this diaphragm, and this is attained with a simplified construction of the apparatus relatively to those used hitherto. The manufacture of a feeding wheel with teeth of different pitches on its rim presents no particular difficulties, as it is only requisite to provide a correspondingly designed dividing plate for that purpose. Milling the teeth with its different pitches is then accurately as simple as milling teeth with equal pitch, as usual.

If more than two pitches around the circumference of the feeding wheels are used, the angle ranges of the individual tooth row sectors are so determined relatively to the pawl stroke angles, or to the feeding wheel turning angles respectively, that the several pawls always engage teeth with different pitches. The number of the teeth with the same pitch may differ from the teeth with another pitch by a certain medium value, that is to say, may oscillate around this value, in fact solely by one tooth. Thus, for instance, where there are teeth with four different pitches on the rim of the feeding wheel, their number may be=$x$, $x-1$, $x$, $x+1$.

The invention is illustrated diagrammatically and by way of example on the accompanying drawing, on which Figure 1 is a vertical section through a dry gas-meter having two measuring chambers and being equipped with a driving gear for the counting mechanism designed according to this invention.

Figure 2 is a perspective representation of the left-hand half of the uppermost portion of Fig. 1, drawn to a greatly enlarged scale relatively thereto.

On the drawing, 1 denotes the casing and 2 and 3 denote the two measuring chambers which are separated from another by an oscillating diaphragm 4. This latter has a rigid middle portion 5 from which extends upwards a rigid bow 6 that is suspended at its upper end on a pivot 7 secured to the valve-box 8. The measuring device and the switching-over mechanism is housed in a chamber 9 lying outside the measuring chambers 2 and 3. The measuring device and the switching-over mechanism are connected with the diaphragm 4, 5 by the intermediary of a spindle 10 which extends from the chamber 9 into the chamber 3 through a stuffing-box (not shown). Outside the chamber 9, or in the chamber 3 respectively, the spindle 10 is connected with the lever-arm 11, the other end of which is connected by a bolt 11a with a lever-arm 12 hinged to the rigid plate 5 of the diaphragm. Within the chamber 9 the spindle 10 is connected with a lever 14 which extends downwardly between two prongs 15 forming the lower end of a double-armed lever 16 supported on the axle 17. The other end 18 of said lever engages the lower end of a rod 19, the upper end of which is connected with the spindle 20 that extends through the casing 8 and to which are affixed the two valve disks 21 and 22. The opening co-operating with the valve-disk 21 communicates with the measuring chamber 2 and the opening co-operating with the valve-disk 22 communicates with the measuring chamber 3. The lever 18 is also coupled with a device able to change-over suddenly the two valve-disks, but as this device does not form a part of the present invention, it has been omitted, from which reason said lever has been drawn as being broken off.

Secured to the spindle 10 is also an arm 24 jointed to a rod 25, the upper end of which is designed as a sort of fork 26, 28. At the upper end of the prong or arm 26 is a pawl 27, and the prong or arm 28 is connected with a pawl 30 by the intermediary of a link 29. The pivots bearing said two pawls are located in levers 33 and 34 supported on the axle 35 that carries also the feeding wheel 36, into the teeth of which the said pawls are pressed by springs 37 and 38.

The axle 35 is firmly connected with the counting device which is likewise not shown in the drawing, as it likewise does not form a part of this invention. Said wheel 36 is subdivided into sectors 39, 40, 41, and 42, as indicated by the circle and the two diameters crossing one another and drawn in thin lines. The number of teeth in the consecutive sectors amounts to $x, x-1, x, x+1$. Thus, the first sector may have, for instance 15 teeth, the second may have 14 teeth, the third again 15 and the fourth sector may have 16 teeth.

The threaded branch 43 serves for connecting the gas-meter with the gas pipe which may be the supply pipe or the delivery pipe according as to how the meter is connected up to the main. In front of the drive gear is a glass window 44 through which the indications can be read. The pawls 27 and 30 engage always sectors (of the wheel 36) with different pitches.

The manner of operation of the device is as follows: The gas streaming through the meter causes the diaphragm to move to and fro, or to oscillate respectively, whereby the spindle 10 is turned alternately in the one and the other direction by the intermediary of the arms 12 and 11. Owing thereto, the arm 14 which is, of course, oscillated in the same manner by the intermediary of the prongs 15 oscillates in turn the double-armed lever 16 on its pivot 17. The upper end 18 of the lever 16 effects the changing-over of the valve-disks 21 and 22.

While said movements take place, the spindle 10 moves the arm 24 up and down whereby the pawls 27 and 30 are actuated alternately by the intermediary of the members 26, 28 and 29. At each movement of these members the one pawl is moved forwardly so as to turn the wheel 36, whereas the other pawl is moved rearwardly without exerting any effect upon said wheel. In the example shown in the drawing, the rod 25 when being moved upwardly moves the pawl 30 forwardly and turns thereby the wheel 36, whereas when the rod 25 is moved downwardly the other pawl turns said wheel; the extent of this turning is determined by the extent of movement of the diaphragm 4, 5. Thus, the entire path of the diaphragm is measured, not merely the number of oscillations.

As the pawls 27 and 30 engage always sectors (of the wheel 36) with teeth of different pitches, and as, where there is a plurality of different pitches the engaging sectors for the pawls change continually, there varies, therefore, continually also the back-lash or lost motion of the two pawls and the measuring fault changes, thus, from the one pawl stroke to the next pawl stroke, and so on. These variations take place in dependency of the dimensions, the tooth pitches, the load of the gas-meter and also of certain other causes, always in such a manner that the single faults oscillate around a certain definite medium value. When the gas-meter has been gauged for this value, its measuring accuracy remains always the same also at different loads.

In the accompanying drawing the invention has been shown merely in prepared form and by way of example, but it will be understood that many changes and modifications may be made therein and in its mode of application without departing from the spirit of the invention, so for instance the number of the pawls co-operating with the feed-wheel may be chosen corresponding to the desired measuring accuracy, also the number of the feeding wheel sectors with the different pitches may be chosen as desired. The invention is usable in combination with gas meters of any constructional form. It is to be understood therefore that the invention is not limited to any specific form or arrangement except insofar as such limitations are specified in the appended claims.

I claim:—

1. A mechanical movement particularly for counting mechanisms, comprising a wheel having one set of teeth of different pitches, a pawl cooperating with the ratchet teeth, and means for operating the pawl, said teeth of different pitches averaging the amount of lost motion between the ratchet and pawl when the extent of movement of the pawl varies somewhat.

2. A mechanical movement according to claim 1, in which the different pitches differ slightly from one another.

3. A mechanical movement particularly for counting mechanisms, comprising a wheel having one set of teeth divided into successive quadrants of different pitches, a pair of pawls cooperating with the ratchet teeth, and means for operating the pawls, said pawls engaging the teeth of two quadrants which have different pitches so that the amount of lost motion is averaged between the pawls and ratchet wherein the extent of movement of the pawl varies somewhat.

4. A mechanical movement according to claim 3, in which there are four quadrants and the teeth of which have different pitches alternating with one another in the successive quadrants.

5. A mechanical movement according to claim 3, in which there are four quadrants and the teeth of which have different pitches alternating as $x$, $x-1$, $x$ and $x+1$.

6. A mechanical movement particularly for counting mechanisms, comprising a wheel having a set of teeth of different pitches, and a pawl cooperating with the ratchet teeth which has an extent of movement which varies somewhat, said teeth of different pitches averaging the amount of lost motion between the pawl and the ratchet.

PAUL SCHUBERT.